(12) United States Patent
Hamamoto et al.

(10) Patent No.: US 11,989,070 B2
(45) Date of Patent: *May 21, 2024

(54) ENERGY STORAGE PACK AUTHENTICATION METHOD, ENERGY STORAGE PACK, CHARGING DEVICE, ELECTRIC MOBILE OBJECT, AND CONTROL DEVICE FOR ELECTRIC MOBILE OBJECT

(71) Applicant: Panasonic Intellectual Property Management Co., Ltd., Osaka (JP)

(72) Inventors: Katsuaki Hamamoto, Osaka (JP); Masaaki Kuranuki, Kyoto (JP); Ryosuke Nagase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 36 days.

This patent is subject to a terminal disclaimer.

(21) Appl. No.: 17/793,599

(22) PCT Filed: Dec. 28, 2020

(86) PCT No.: PCT/JP2020/049227
§ 371 (c)(1),
(2) Date: Jul. 18, 2022

(87) PCT Pub. No.: WO2021/149468
PCT Pub. Date: Jul. 29, 2021

(65) Prior Publication Data
US 2023/0062322 A1 Mar. 2, 2023

(30) Foreign Application Priority Data

Jan. 23, 2020 (JP) ................................ 2020-009035

(51) Int. Cl.
*G06F 1/00* (2006.01)
*G06F 1/28* (2006.01)
(Continued)

(52) U.S. Cl.
CPC .............. *G06F 1/28* (2013.01); *H04W 12/06* (2013.01); *H04W 12/47* (2021.01)

(58) Field of Classification Search
CPC ................................. G06F 1/28; H04W 12/47
See application file for complete search history.

(56) References Cited

U.S. PATENT DOCUMENTS

2009/0256717 A1* 10/2009 Iwai .......................... G06F 1/26
700/295
2011/0099111 A1* 4/2011 Levy ...................... G06Q 50/06
705/14.1
(Continued)

FOREIGN PATENT DOCUMENTS

JP  2011-125186 A  6/2011

OTHER PUBLICATIONS

International Search Report dated Feb. 2, 2021 in International Application No. PCT/JP2020/049227, with English translation.

*Primary Examiner* — Mohammed H Rehman
(74) *Attorney, Agent, or Firm* — Rimon P.C.

(57) ABSTRACT

An electric movable body transmits a signal including identification information identical to identification information retained in a first power storage pack via near-field communication when the first power storage pack is detached from the electric movable body. A charging device wiredly transmits the identification information received from the electric movable body to a second power storage pack. The second power storage pack transmits via near-field communication a signal including the identification information received from the charging device. The electric (Continued)

movable body collates whether or not the identification information included in the received signal matches the identification information retained in the first power storage pack.

10 Claims, 9 Drawing Sheets

(51) Int. Cl.
*H04W 12/06* (2021.01)
*H04W 12/47* (2021.01)

(56) References Cited

U.S. PATENT DOCUMENTS

| | | | |
|---|---|---|---|
| 2011/0131083 A1* | 6/2011 | Redmann | G07F 17/24 |
| | | | 705/13 |
| 2013/0119947 A1* | 5/2013 | Ishida | B60L 53/68 |
| | | | 320/162 |
| 2014/0232327 A1* | 8/2014 | Hasegawa | B60L 3/00 |
| | | | 320/137 |
| 2015/0123619 A1* | 5/2015 | Marathe | B60L 58/21 |
| | | | 320/137 |
| 2019/0023140 A1* | 1/2019 | Kim | B60L 53/12 |
| 2023/0062322 A1* | 3/2023 | Hamamoto | H01M 50/576 |

\* cited by examiner

ENERGY STORAGE PACK AUTHENTICATION METHOD, ENERGY STORAGE PACK, CHARGING DEVICE, ELECTRIC MOBILE OBJECT, AND CONTROL DEVICE FOR ELECTRIC MOBILE OBJECT

CROSS-REFERENCE OF RELATED APPLICATIONS

This application is the U.S. National Phase under 35 U.S.C. § 371 of International Patent Application No. PCT/JP2020/049227, filed on Dec. 28, 2020, which in turn claims the benefit of Japanese Patent Application No. 2020-009035, filed on Jan. 23, 2020, the entire disclosures of which Applications are incorporated by reference herein.

TECHNICAL FIELD

The present invention relates to a method of authenticating a power storage pack mounted in and detached from an electric movable body, a power storage pack, a charging device, an electric movable body, and a controller for an electric movable body.

BACKGROUND ART

In recent years, electric motorcycles (electric scooters) and electric bicycles have become widespread. Usually, a portable battery pack capable of being mounted and unmounted is used in the electric motorcycle or the electric bicycle. When a battery is used as a power source of the motorcycle (scooter), a time required for energy supply is longer than a case where a liquid fuel such as gasoline is used (a charging time is longer than a fueling time).

Thus, when a state of charge of the battery pack decreases, it is considered that a mechanism for shortening the time required for energy supply is constructed by replacing a battery pack charged in advance with a battery pack having a reduced state of charge at the nearest charging stand.

Meanwhile, a method for confirming connection between a vehicle having an electricity storage device mounted thereon and an external power supply device by using wireless communication when the vehicle and the external power supply device are connected by a charging cable has been proposed (see, for example, PTL 1).

CITATION LIST

Patent Literature

PTL 1: Japanese Patent Laid-Open Publication No. 2011-125186

SUMMARY OF THE INVENTION

Technical Problem

In the above method, it is assumed that the electricity storage device is fixed in the vehicle, and it is not assumed that the electricity storage device is removed from the vehicle. On the other hand, in the above mechanism involving the replacement of the battery pack, a circumstance in which there are a plurality of vehicles or a plurality of chargers in a range in which wireless communication with the battery pack can be performed may occur.

Under such a circumstance, there is a possibility that a controller of a certain vehicle erroneously controls a battery pack mounted in another adjacent vehicle. There is a possibility that a controller of the charger does not control the battery pack which is to be controlled and is mounted in a certain charging slot and erroneously controls the battery pack which is not to be controlled and is mounted in another charging slot. In such a case, safety and security of the entire charging system cannot be secured.

The present disclosure has been made in view of such a circumstance, and an object of the present disclosure is to provide a technique for correctly identifying a mounted power storage pack by an electric movable body or a charging device that controls the power storage pack by using wireless communication.

Solution to Problem

In order to solve the above problem, a power storage pack authentication method according to an aspect of the present disclosure includes: transmitting, by a controller of an electric movable body, a signal including identification information identical to identification information retained in a first power storage pack via near-field communication when the first power storage pack is detached from the electric movable body; wiredly transmitting, by a controller of a charging device, the identification information received from the electric movable body to a controller of a second power storage pack which is replaceable with the first power storage pack and which is mounted in a second charging slot after a controller of a charging device receives the signal transmitted via the near-field communication and after the first power storage pack detached from the electric movable body is mounted in a first charging slot of the charging device; transmitting via near-field communication, by the controller of the second power storage pack, a signal including the identification information received from the charging device after the second power storage pack detached from the second charging slot is mounted in the electric movable body; and collating, by the controller of the electric movable body, whether or not the identification information included in the received signal matches the identification information retained in the first power storage pack after the controller of the electric movable body receives the signal transmitted via the near-field communication, and authenticating that the second power storage pack mounted in the electric movable body is identical to a partner device communicating via the near-field communication when the identification information included in the received signal matches the identification information retained in the first power storage pack.

According to the present disclosure, the electric movable body or the charging device that controls the power storage pack by using wireless communication correctly identify the mounted power storage pack.

DESCRIPTION OF EMBODIMENT

Figure 1:
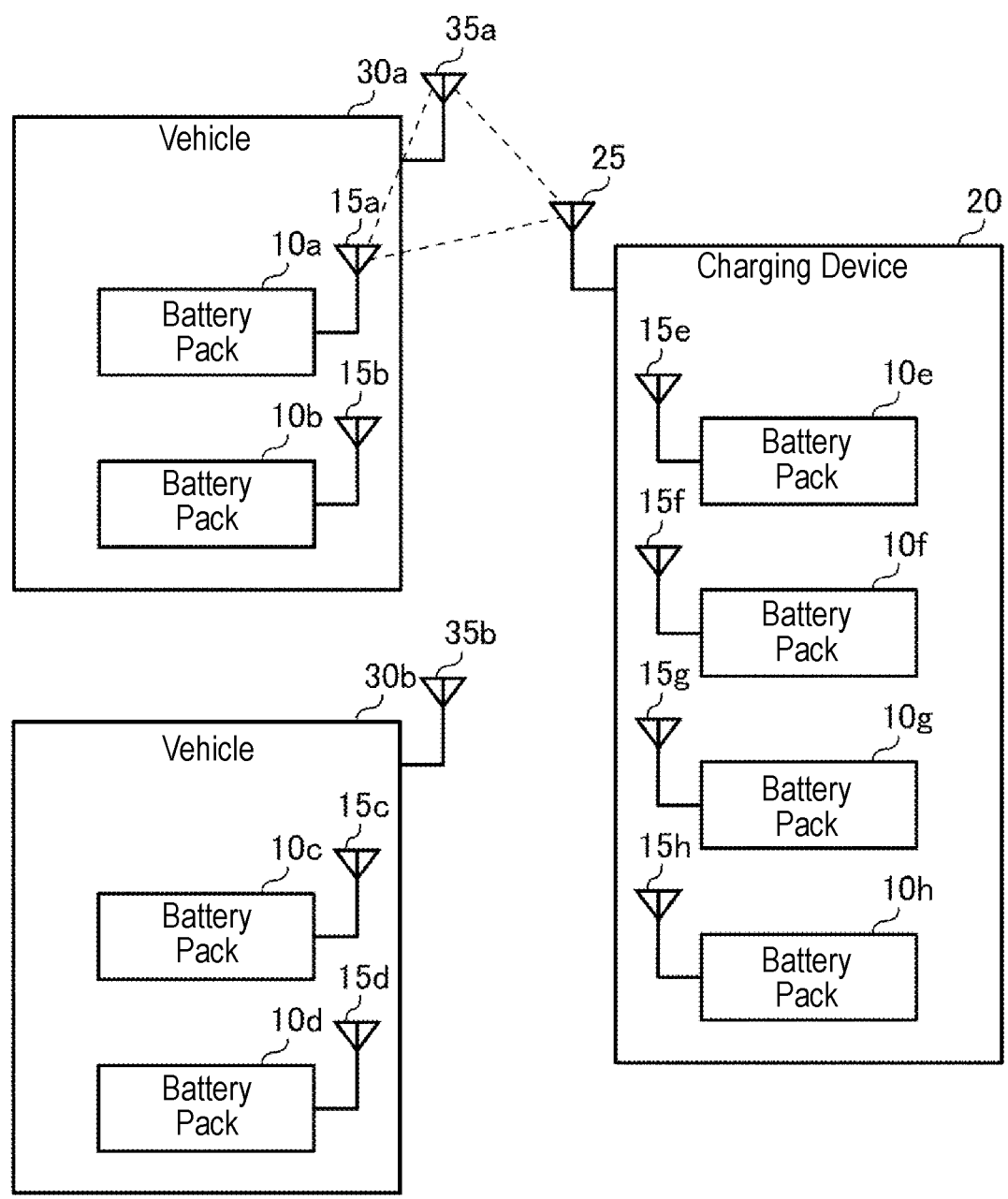
FIG. 1 is a conceptual diagram of a vehicle system using a replaceable battery pack according to an exemplary embodiment.

FIG. 1 is a conceptual diagram of vehicle system 1 using replaceable battery pack 10 according to an exemplary embodiment. Vehicle system 1 includes plural battery packs 10, at least one charging device 20, and plural vehicles 30 are used. In the present exemplary embodiment, an electric motorcycle (electric scooter) is assumed as vehicle 30.

Battery pack 10 is a portable or replaceable battery pack capable of being mounted and detached, and can be mounted in a mounting slot of vehicle 30 and a charging slot of charging device 20. Battery pack 10 is charged while being mounted in the charging slot of charging device 20. Charged battery pack 10 is taken out by a user (usually, a driver of vehicle 30) and is mounted in the mounting slot of vehicle 30. Battery pack 10 mounted in the mounting slot of vehicle 30 is discharged during traveling of vehicle 30, and has a state of charge reduced accordingly. Battery pack 10 having the reduced state of charge is taken out by the user and is mounted in the charging slot of charging device 20. The user takes out charged battery pack 10 from another charging slot of charging device 20 and mounts the charged battery pack in the mounting slot of vehicle 30. Battery pack 10 having the reduced state of charge is thus replaced with charged battery pack 10. As a result, the user does not need to wait for the charging of battery pack 10, and can restart the traveling of vehicle 30 in a short time.

In this method, since battery pack 10 is frequently mounted and detached, deterioration of a connector of battery pack 10 contacting a connector of the mounting slot of vehicle 30 or a connector of the charging slot of charging device 20 easily progresses. As a countermeasure, in the present exemplary embodiment, a control signal is transmitted and received between battery pack 10 and each of vehicle 30 and charging device 20 by wireless communication. As a result, a terminal for a communication line can be eliminated from a connector. A terminal for a power line may be provided in the connector. In the present exemplary embodiment, since wired communication via the connector is not used for the transmission and reception of the control signal, the control signal is prevented from being interrupted due to a connector defect.

Near-field communication is used for wireless communication between vehicle 30 and battery pack 10, wireless communication between charging device 20 and battery pack 10, and wireless communication between vehicle 30 and charging device 20. Bluetooth®, Wi-Fi®, infrared communication, and the like may be used as the near-field communication. Hereinafter, in the present exemplary embodiment, it is assumed that Bluetooth® Low Energy (BLE) is used as the near-field communication.

The BLE is an extended standard of Bluetooth®, and is a low-power-consumption near-field communication standard using a 2.4 GHz band. Since the BLE has low power consumption such that the battery pack may be powered for several years with a single button cell, the battery pack is suitable for battery powering, and the influence on the state of charge of battery pack 10 may be almost ignored. Since a lot of modules for BLE communication are put in the market, the modules may be obtained at low cost. The BLE has high affinity with a smartphone, and can provide various services in cooperation with the smartphone.

When a general class II device is used, a radio wave coverage of the BLE is about 10 m. Therefore, plural vehicles 30, plural battery packs 10, and charging devices 20 may exist within a communication range of the BLE. Since the plural charging slots are provided in charging device 20, charging device 20 needs to wirelessly communicate with plural battery packs 10 mounted in plural charging slots. That is, a 1:N network is established between charging device 20 and each of plural battery packs 10. Similarly, in the case that plural mounting slots are provided in vehicle 30, vehicle 30 needs to wirelessly communicate with plural battery packs 10 mounted in the plural mounting slots. That is, a 1:N network is established between vehicle 30 and each of the plural battery packs 10.

Therefore, a mechanism for ensuring that battery pack 10 mounted in a specific charging slot of charging device 20 is required to be identical to battery pack 10 of a specific communication partner device of charging device 20. Similarly, a mechanism for ensuring that battery pack 10 mounted in a specific mounting slot of vehicle 30 is required to be identical to battery pack 10 of a specific communication partner device of vehicle 30. In the present exemplary embodiment, the identity between battery pack 10 physically connected and battery pack 10 connected by wireless communication is confirmed by identification information (ID). The identification information (ID) may be temporal identification information. The identification information (ID) may include identification information unique to each device.

Figure 2:
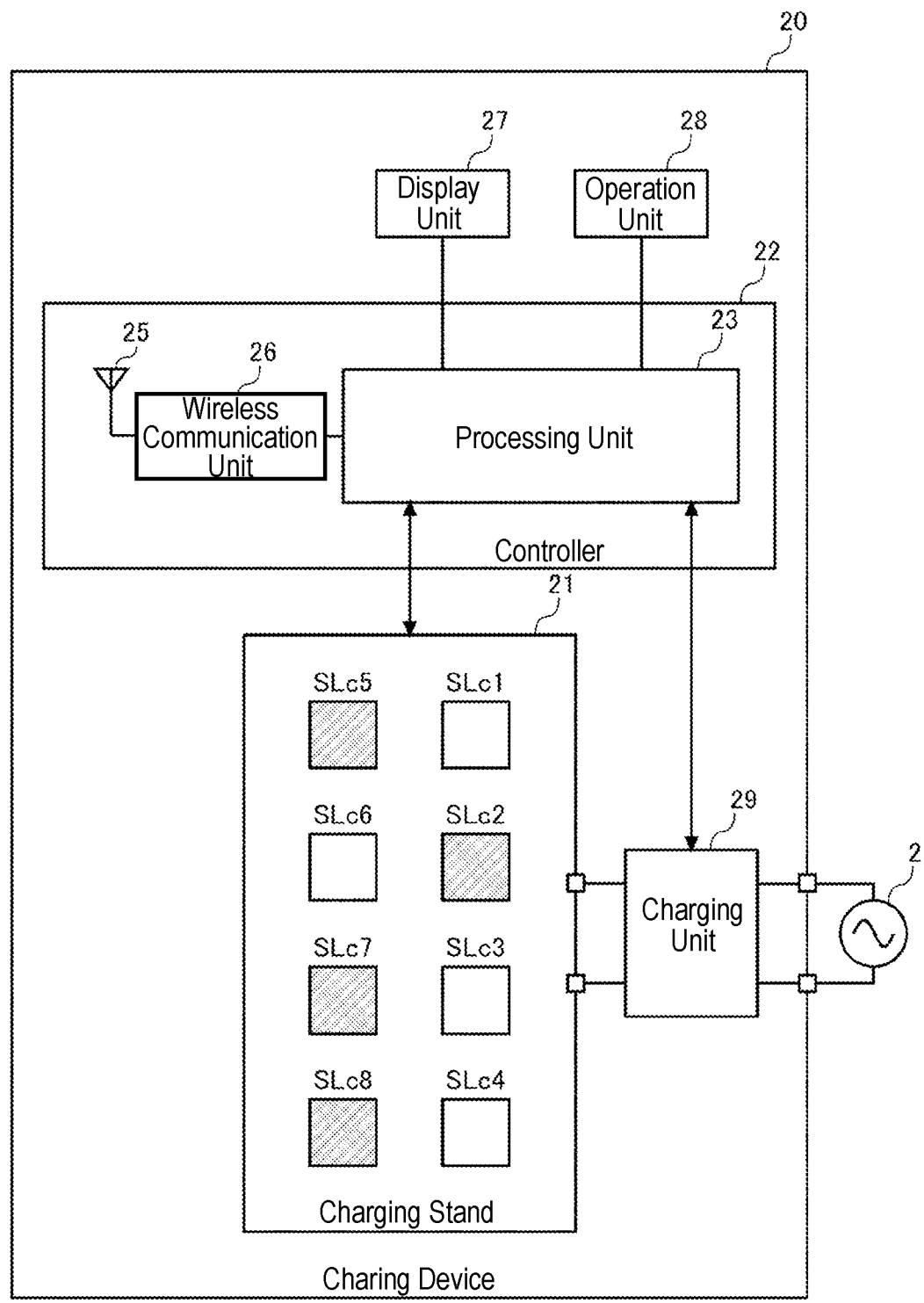
FIG. 2 is a diagram illustrating a configuration example of a charging device according to the exemplary embodiment.

FIG. 2 is a diagram illustrating a configuration example of charging device 20 according to the exemplary embodiment. Charging device 20 includes charging stand 21, controller 22, display unit 27, operation unit 28, and charging unit 29. Controller 22 includes at least processing unit 23, antenna 25, and wireless communication unit 26.

Charging stand 21 has plural charging slots SLc1 to SLc8 in which plural battery packs 10 are mounted, respectively. In the example illustrated in FIG. 2, the number of charging slots is eight. The number of charging slots may be two or more, and may be four, for example.

Each of charging slots SLc1 to SLc8 includes a connector including a positive electrode terminal and a negative electrode terminal. When battery pack 10 is mounted, the charging slots are electrically conducted to a positive electrode terminal and a negative electrode terminal included in the connector of battery pack 10, respectively. The negative electrode terminal included in the connector of each of charging slots SLc1 to SLc8 and the negative electrode terminal included in the connector of battery pack 10 may be solid grounds. In this case, pins included in the connector of battery pack 10 may be integrated with one of positive electrode terminal pins, and the number of projection portions of the connector with defect may be reduced.

Processing unit 13 (see FIG. 4) of each battery pack 10 mounted in charging stand 21 transmits and receives a control signal to and from processing unit 23 in controller 22 via the near-field communication and a power line. A specific method for transmitting and receiving the control signal between the processing units will be described later.

The positive electrode terminal and the negative electrode terminal of each of charging slots SLc1 to SLc8 are connected to a positive electrode terminal and a negative electrode terminal of charging unit 29, respectively. Charging unit 29 is connected to commercial power system 2, and is configured to charge battery pack 10 mounted in charging stand 21. Charging unit 29 generates direct-current (DC) power by performing full-wave rectifying of alternating-current (AC) power supplied from commercial power system 2 and smoothing the rectified AC power with a filter.

Relays (not illustrated) are provided between the positive electrode terminal and the negative electrode terminal of charging unit 29 and the positive electrode terminal and the negative electrode terminal of each of charging slots SLc1 to SLc8. Processing unit 23 controls control conduction or interruption of each of charging slots SLc1 to SLc8 by controlling turning on (closing) and turning off (opening) of each relay.

A DC/DC converter (not illustrated) may be provided between the positive electrode terminal and the negative electrode terminal of charging unit 29 and the positive electrode terminal and the negative electrode terminal of each of charging slots SLc1 to SLc8. In this case, processing unit 23 controls a charging voltage or a charging current of each battery pack 10 by controlling the DC/DC converter. For example, constant current (CC) charging or constant voltage (CV) charging can be performed. The DC/DC converter may be provided in battery pack 10. When an AC/DC converter is mounted in battery pack 10, battery pack 10 may be charged with AC power from charging unit 29.

Processing unit 23 is, for example, a microcomputer. Wireless communication unit 26 executes a near-field communication process. In the present exemplary embodiment, wireless communication unit 26 includes a BLE module, and antenna 25 includes a chip antenna built in the BLE module or a pattern antenna. Wireless communication unit 26 outputs data received via near-field communication to processing unit 23, and transmits data input from processing unit 23 via near-field communication.

Processing unit 23 may acquire battery state information from battery pack 10 mounted in charging stand 21. At least one of voltage, current, temperature, state of charge (SOC), and state of health (SOH) of plural cells E1 to En (see FIG. 4) in battery pack 10 can be acquired as the battery state information.

Display unit 27 includes a display, and displays guidance to the user (usually, the driver of vehicle 30) who uses charging device 20 on the display. Operation unit 28 is a user interface such as a touch panel, and accepts an operation from the user. Charging device 20 may further include a loudspeaker (not illustrated) and may output audio guidance from the loudspeaker to the user.

Figure 3:
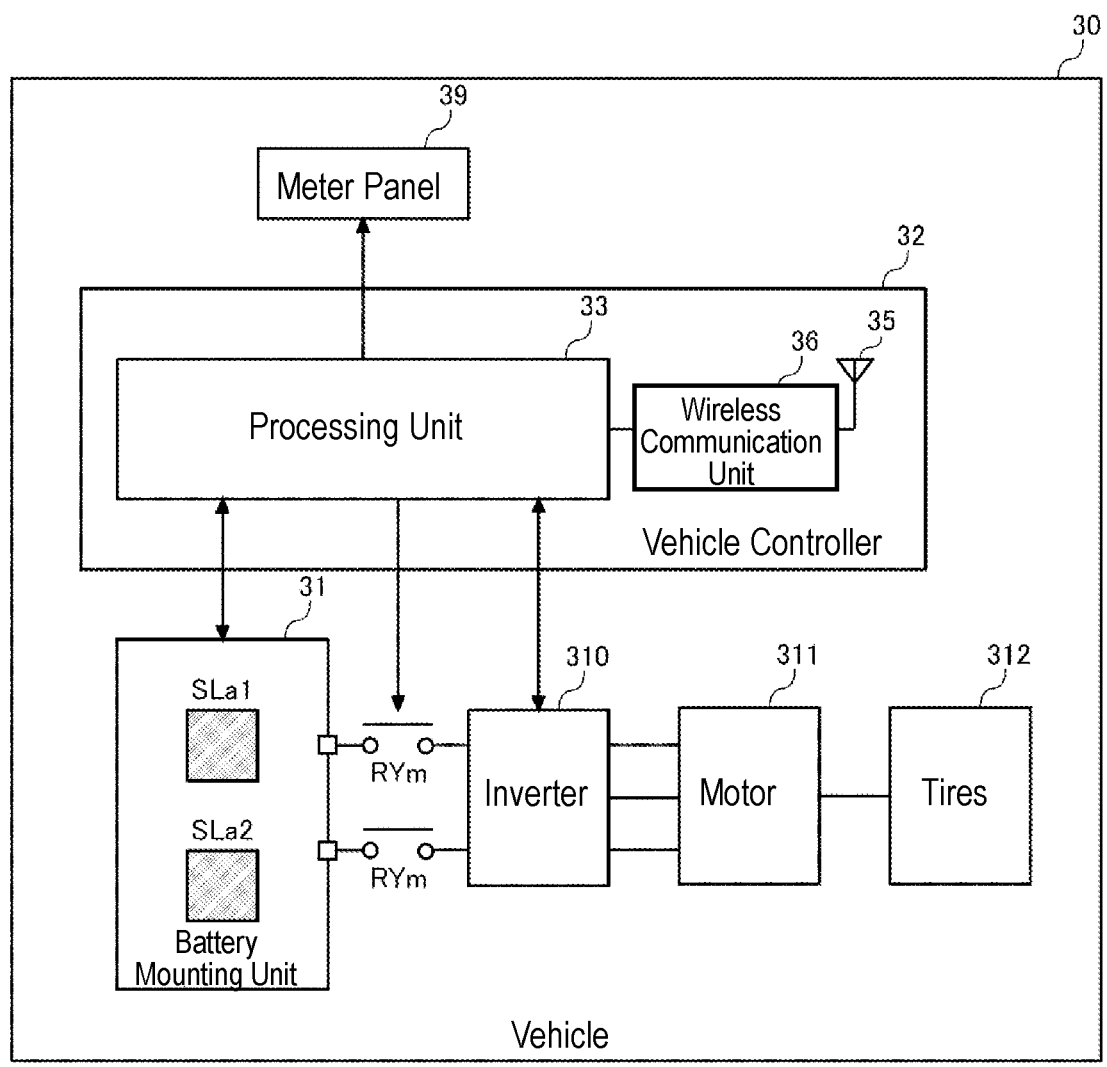
FIG. 3 is a diagram illustrating a configuration example of a vehicle according to the exemplary embodiment.

FIG. 3 is a diagram illustrating a configuration example of vehicle 30 according to the exemplary embodiment. Vehicle 30 includes battery mounting unit 31, vehicle controller 32, meter panel 39, inverter 310, motor 311, and tire 312. Vehicle controller 32 includes at least processing unit 33, antenna 35, and wireless communication unit 36.

Battery mounting unit 31 has at least one of mounting slots SLa1 and SLa2 for mounting at least one battery pack 10. In the example illustrated in FIG. 3, although the number of mounting slots is two, the number of mounting slots may be one or three or more.

Each of mounting slots SLa1 and SLa2 includes a connector including a positive electrode terminal and a negative electrode terminal, and when battery pack 10 is mounted, the mounting slots are electrically conducted to the positive electrode terminal and the negative electrode terminal included in the connector of battery pack 10, respectively. The negative electrode terminal portion included in the connector of each of mounting slots SLa1 and SLa2 may be a solid GND.

Processing unit 13 (see FIG. 4) of each battery pack 10 mounted in battery mounting unit 31 transmits and receives a control signal to and from processing unit 33 in vehicle controller 32 via near-field communication and a power line. A specific method for transmitting and receiving the control signal between the processing units will be described later.

The plural positive electrode terminals of the plural mounting slots SLa1 and SLa2 are connected to a positive-side power bus, and the plural negative electrode terminals are connected to a negative-side power bus. Therefore, the plural battery packs 10 mounted in the plural mounting slots SLa1 and SLa2 are electrically connected in parallel to one another. Therefore, as the number of battery packs 10 mounted in battery mounting unit 31 increases, the capacity increases. The plural battery packs 10 mounted in the plural mounting slots SLa1 and SLa2 may be electrically connected in series to one another. In this case, an output voltage is increased.

A positive electrode terminal and a negative electrode terminal of battery mounting unit 31 are connected to a positive electrode terminal and a negative electrode terminal of inverter 310, respectively, via main relay RYm. Main relay RYm functions as a contactor between vehicle 30 and battery pack 10. Processing unit 33 controls conduction or interruption between vehicle 30 and battery pack 10 by controlling turning on and off of main relay RYm.

Inverter 310 converts DC power supplied from battery pack 10 mounted in battery mounting unit 31 into AC power and supplies the AC power to motor 311 at the time of power running. The inverter converts AC power supplied from motor 311 into DC power and supplies the DC power to battery pack 10 mounted in battery mounting unit 31 at the time of regeneration. Motor 311 is a three-phase AC motor, and rotates in accordance with the AC power supplied from inverter 310 at the time of power running. At the time of regeneration, the motor converts rotational energy created by deceleration into AC power and supplies the AC power to inverter 310. A rotary shaft of motor 311 is coupled to a rotary shaft of tire 312 of a rear wheel. A transmission may be provided between the rotary shaft of motor 311 and the rotary shaft of tire 312.

Vehicle controller 32 is a vehicle electronic controller (ECU) configured to control entire vehicle 30. Processing unit 33 of vehicle controller 32 includes a microcomputer. Wireless communication unit 36 executes a near-field communication process. In the present exemplary embodiment, wireless communication unit 36 includes a BLE module, and antenna 35 includes a chip antenna built in the BLE module or a pattern antenna. Wireless communication unit 36 outputs data received via near-field communication to processing unit 33, and transmits data input from processing unit 33 via the near-field communication.

Processing unit 33 may acquire battery state information from battery pack 10 mounted in battery mounting unit 31. Information of at least one of voltage, current, temperature, SOC, and SOH of plural cells E1 to En (see FIG. 4) in battery pack 10 can be acquired as the battery state information. Processing unit 33 may acquire a speed of vehicle 30.

Meter panel 39 displays state information of vehicle 30. For example, the speed of vehicle 30 and the state of charge (SOC) of battery pack 10 are displayed. The driver may determine the necessity of replacement of battery pack 10 by looking at the state of charge (SOC) of battery pack 10 displayed on meter panel 39.

Figure 4:
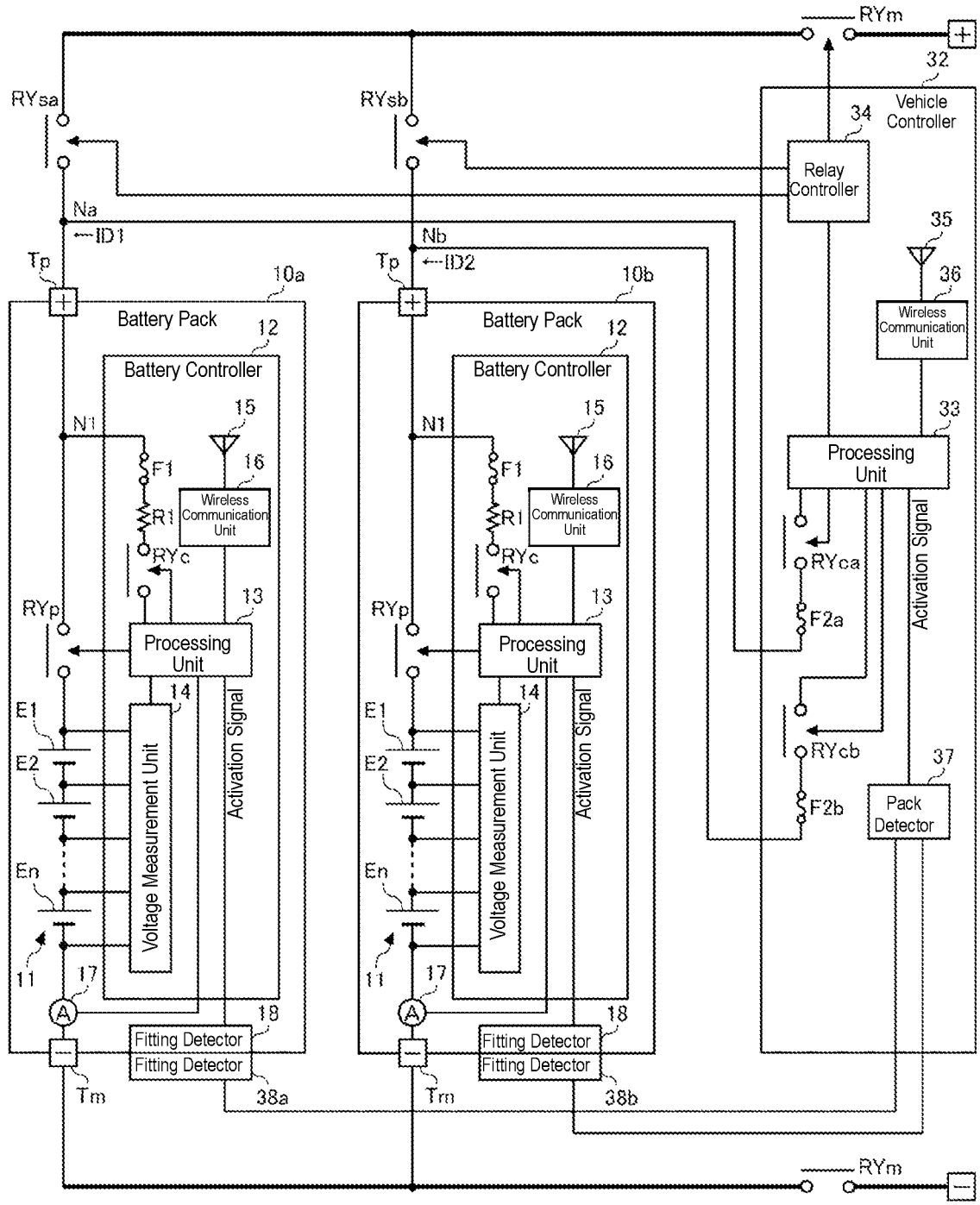
FIG. 4 is a diagram illustrating a system configuration example of a battery pack mounted on the vehicle and a vehicle controller according to the exemplary embodiment.

FIG. 4 is a diagram illustrating a system configuration example of battery pack 10 mounted in vehicle 30 and vehicle controller 32 according to the exemplary embodiment. In the example illustrated in FIG. 4, two battery packs 10a and 10b are mounted in battery mounting unit 31 of vehicle 30 (see FIG. 3).

Battery pack 10 includes battery module 11 and battery controller 12. Battery module 11 is connected on a power line internally connecting positive electrode terminal Tp to negative electrode terminal Tm of battery pack 10. Positive electrode terminal Tp of battery pack 10 is connected to the positive-side power bus via slot relay RYs, and negative electrode terminal Tm of battery pack 10 is connected to the negative-side power bus. The positive-side power bus and the negative-side power bus are connected to inverter 310 via main relay RYm (see FIG. 3).

Battery module 11 includes plural cells E1 to En connected in series to one another. Battery module 11 may include plural battery modules connected in series to one another or in series and parallel to one another. Each cell may be a lithium ion battery cell, a nickel metal hydride battery cell, a lead battery cell, or the like. Hereinafter, in this specification, the description is made by assuming an example where a lithium ion battery cell (having a nominal voltage of 3.6 V to 3.7 V) is used as the cell. The number of cells E1 to En is determined in accordance with a drive voltage of motor 311.

A communication path is branched from node N1 between positive electrode terminal Tp of battery pack 10 and battery module 11. Power relay RYp is inserted between node N1 and battery module 11. Current sensor 17 is installed on the power line internally connecting positive electrode terminal Tp to negative electrode terminal Tm of battery pack 10. Current sensor 17 is installed at a position closer to negative electrode terminal Tm than power relay RYp. Current sensor 17 is configured to measure a current flowing through battery module 11, and outputs the measured current value to processing unit 13 of battery controller 12. Current sensor 17 may include, for example, a combination of a shunt resistor, a differential amplifier, and an A/D converter. A Hall element may be used in place of the shunt resistor.

Battery controller 12 includes processing unit 13, voltage measurement unit 14, antenna 15, and wireless communication unit 16. Voltage measurement unit 14 is connected via plural voltage measurement lines to nodes between plural cells E1 to En, connected in series to one another. Voltage measurement unit 14 is configured to measure voltages of cells E1 to En by measuring each voltage between two adjacent voltage measurement lines. Voltage measurement unit 14 transmits the measured voltages of cells E1 to En to processing unit 13.

Voltage measurement unit 14 has a higher voltage than processing unit 13 and hence, voltage measurement unit 14 is connected to processing unit 13 via a communication line while voltage measurement unit 14 is insulated from processing unit 13. Voltage measurement unit 14 can be implemented by an application specific integrated circuit (ASIC) or a general-purpose analog front-end IC. Voltage measurement unit 14 includes a multiplexer and an A/D converter. The multiplexer outputs a voltage between two adjacent voltage measurement lines to the A/D converter in order from the top. The A/D converter converts analog voltages input from the multiplexer into digital values.

While not illustrated in FIG. 4, at least one temperature sensor is installed near plural cells E1 to En. The temperature sensor measures the temperatures of cells E1 to En. and outputs the measured temperatures to processing unit 13. The temperature sensor may include, for example, a combination of a thermistor, a voltage dividing resistor, and an A/D converter.

In the case that an A/D converter is mounted in processing unit 13 and an analog input port is installed in processing unit 13, output values of current sensor 17 and the temperature sensor can be input, as analog values, to processing unit 13.

Fitting detector 18 is configured to detect a fitting state between the connector of battery pack 10 and the connector of battery mounting unit 31 of vehicle 30. For example, the connector of battery pack 10 may be a female connector, and the connector of battery mounting unit 31 of vehicle 30 may be a male connector. Fitting detector 18 outputs activation signals corresponding to connection states of both the connectors to processing unit 13. The activation signal is defined by a binary signal: an ON signal output while both the connectors are connected to each other; and an OFF signal output while both the connectors are separated to each other. Fitting detector 18 may be implemented by, for example, a reed switch. In this case, fitting detector 18 magnetically determines whether both the connectors are connected to each other or not. The fitting detector may be implemented by a sensor configured to mechanically detect the presence or absence of connection between both the connectors may be used.

Wireless communication unit 16 executes a near-field communication process. In the present exemplary embodiment, wireless communication unit 16 includes a BLE module, and antenna 15 includes a chip antenna built in the BLE module or a pattern antenna. Wireless communication unit 16 is configured to output, to processing unit 13, data received via near-field communication, and to transmit, via near-field communication, data input from processing unit 13.

Node N1 between positive electrode terminal Tp of battery pack 10 and battery module 11 is connected to processing unit 13 via a communication path. Fuse F1, resistor R1, and pack-side communication relay RYc are connected in series to one another on the communication path. Fuse F1 is a protector preventing an overcurrent from flowing into processing unit 13 from the power line.

Processing unit 13 includes a microcomputer. Processing unit 13 is activated when the activation signal input from fitting detector 18 is turned on, and is shut down when the activation signal is turned off. Instead of shutdown, transition to a standby state or a sleep state may be performed.

Processing unit 13 controls conduction or interruption of the communication path between node N1 and processing unit 13 by controlling turning on and off of pack-side communication relay RYc. Processing unit 13 is configured to control states of cells E1 to En based on the voltage values, the current values, and the temperature values of the cells E1 to En measured by voltage measurement unit 14, current sensor 17, and the temperature sensor. For example, when overvoltage, undervoltage, overcurrent, high-temperature anomaly, or low-temperature anomaly occurs, processing unit 13 turns off power relay RYp to protect the cells E1 to En.

Processing unit 13 is configured to estimate the SOCs and the SOHs of cells E1 to En. Processing unit 13 is configured to estimate the SOCs by an open circuit voltage (OCV) method or a current integration method. The SOH is defined as a ratio of a current full charge capacity to an initial full charge capacity. The SOH having a lower value (closer to 0%) indicates that degradation progresses more. The SOH may be obtained by measuring the capacity through full charging and discharging, or may be obtained by adding storage degradation and cycle degradation. The storage degradation may be estimated based on the SOC, the temperature, and a storage degradation rate. The cycle degradation may be estimated based on a range of the SOC in which the battery pack is used, a temperature, a current rate, and a cycle degradation rate. The storage degradation rate and the cycle degradation rate may be previously derived by experiments or simulations. The SOC, the temperature, the range of the range of the SOC, and the current rate may be obtained by measurement.

The SOH may be estimated based on a correlation between the SOH and an internal resistance of a cell. The internal resistance may be estimated by dividing, by the current value, a voltage drop that occurs when a predetermined current flows through the cell for a predetermined time. The internal resistance decreases as the temperature rises, and increases as the SOH decreases.

In the system configuration example illustrated in FIG. 4, vehicle controller 32 includes processing unit 33, relay controller 34, antenna 35, wireless communication unit 36, and pack detector 37. Relay controller 34 is configured to control turning on and off of main relay RYm, first slot relay RYsa, and second slot relay RYsb in response to an instruction from processing unit 33.

Node Na between positive electrode terminal Tp of first battery pack 10a and first slot relay RYsa is connected to processing unit 33 of vehicle controller 32 via a communication path. Fuse F2a and first vehicle-side communication relay RYca are connected in series to each other on the communication path. Processing unit 33 controls conduction or interruption of the communication path between node Na and processing unit 33 by controlling turning on and off of first vehicle-side communication relay RYca.

Similarly, node Nb between positive electrode terminal Tp of second battery pack 10b and second slot relay RYsb is connected to processing unit 33 of vehicle controller 32 via a communication path. Fuse F2b and second vehicle-side communication relay RYcb are connected in series to each other on the communication path. Processing unit 33 controls conduction or interruption of the communication path between node Nb and processing unit 33 by controlling turning on and off of second vehicle-side communication relay RYcb.

In the case that three or more mounting slots are provided in battery mounting unit 31 of vehicle 30, three or more slot relays RYs and three or more communication paths (fuse F2 and vehicle-side communication relay RYc) are provided in parallel.

First fitting detector 38a detects a fitting state between the connector of first mounting slot SLa1 of battery mounting unit 31 and the connector of first battery pack 10a, and outputs to pack detector 37 a detection signal indicating that these connectors are fitted. Similarly, second fitting detector 38b detects a fitting state between the connector of second mounting slot SLa2 of battery mounting unit 31 and the connector of second battery pack 10b, and outputs to pack detector 37 a detection signal indicating that these connectors are fitted. First fitting detector 38a and second fitting detector 38b may detect whether or not the connectors of the mounting slots are connected to the connectors of battery pack 10 by a magnetic method or a mechanical method.

Pack detector 37 outputs to processing unit 33 activation signals corresponding to detection signals input from fitting detectors 38a and 38b. When at least one of the detection signals indicates the connection state, pack detector 37 outputs an activation signal including a slot number of the connection state. When all of the detection signals indicate disconnection states, pack detector 37 controls the activation signal such that the activation signal is in an off state.

In an ignition-on state, processing unit 33 is activated when the activation signal input from pack detector 37 indicates that at least one battery pack 10 is mounted, and is shut down when the activation signal is turned off. Instead of shutdown, transition to a standby state or a sleep state may be performed.

In the system configuration example described above, processing unit 33 of vehicle controller 32 may transmit and receive a control signal to and from processing unit 13 of battery controller 12 via near-field communication.

Processing unit 33 of vehicle controller 32 may transmit and receive the control signal to and from processing unit 13 of battery controller 12 wiredly, i.e., via a wired path. When communication with processing unit 13 of first battery pack 10a is wiredly performed, processing unit 33 of vehicle controller 32 turns off first slot relay RYsa and turns on first vehicle-side communication relay RYca. Processing unit 13 of first battery pack 10a turns off power relay RYp and turns on pack-side communication relay RYc of first battery pack 10a. In this state, the wired path between processing unit 33 of vehicle controller 32 and processing unit 13 of first battery pack 10a is electrically conducted while being insulated from vehicle 30 and a high-voltage unit of battery pack 10. Therefore, serial communication may be performed between processing unit 33 of vehicle controller 32 and processing unit 13 of first battery pack 10a at a voltage (for example, less than or equal to a voltage of 5V) corresponding to an operating voltage of the processing unit.

Similarly, when communication with processing unit 13 of second battery pack 10b is performed wiredly, via a wire, processing unit 33 of vehicle controller 32 turns off second slot relay RYsb and turns on second vehicle-side communication relay RYcb. Processing unit 13 of second battery pack 10b turns off power relay RYp and turns on pack-side communication relay RYc in second battery pack 10b. In this state, the wired path between processing unit 33 of vehicle controller 32 and processing unit 13 of second battery pack 10b is electrically conducted while being insulated from vehicle 30 and the high-voltage unit of battery pack 10.

While not illustrated in FIG. 2, the same configuration as vehicle controller 32 illustrated in FIG. 4 is also provided in controller 22 of charging device 20. Processing unit 23 of charging device 20 may transmit and receive a control signal to and from processing unit 13 of battery controller 12 via near-field communication. Processing unit 23 of charging device 20 may transmit and receive the control signal to and from processing unit 13 of battery controller 12 wiredly, via a wired path.

Figure 5:
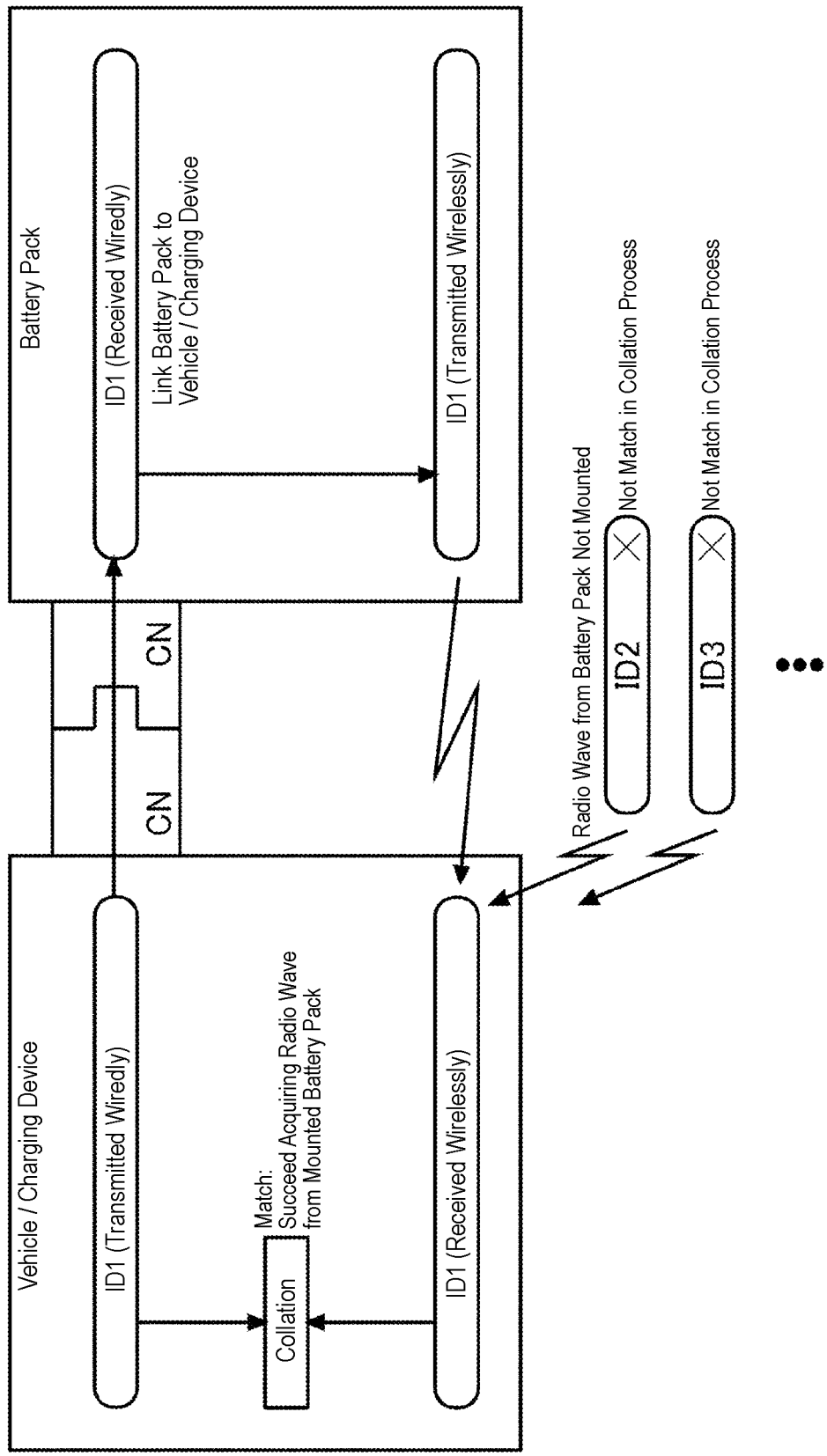
FIG. 5 is a diagram illustrating a basic concept of a process of authenticating, by a vehicle controller, the battery pack mounted in a mounting slot of the vehicle.

FIG. 5 is a diagram illustrating a basic concept of a process of authenticating, by vehicle controller 32, battery pack 10 mounted in mounting slot SLa of vehicle 30. Vehicle controller 32 is basically configured to identify battery pack 10 by searching for a radio wave of the near-field communication transmitted from battery pack 10. Specifically, when battery pack 10 is mounted in mounting slot SLa, vehicle controller 32 wiredly transmits ID1. Upon wiredly receiving the ID1 from vehicle controller 32, battery controller 12 of battery pack 10 transmits a signal including the ID1 via near-field communication.

Upon receiving the signal via the near-field communication, vehicle controller 32 collates the ID included in the received signal with ID1 previously transmitted wiredly. When both the IDs match, vehicle controller 32 authenticates that battery pack 10 mounted in mounting slot SLa is identical to a partner device communicating via the near-field communication. When both the IDs do not match, vehicle controller 32 determines that the partner device communicating via the near-field communication is not identical to battery pack 10 mounted in mounting slot SLa, and does not authenticate battery pack 10 of the partner device. For example, when a signal including ID2 is received, since the ID does not match ID1 transmitted wiredly, battery pack 10 to which has transmitted the signal including the ID2 is not authenticated.

Vehicle controller 32 may determine identity between battery pack 10 mounted in mounting slot SLa and the partner device communicating via the near-field communication by transmitting the ID via the near-field communication and collating the transmitted ID with the ID received wiredly from battery controller 12 of battery pack 10.

A basic concept of the process of authenticating, by vehicle controller 32, battery pack 10 mounted in mounting slot SLa of vehicle 30 has been described above, the same is applicable to a case where controller 22 of charging device 20 authenticates battery pack 10 mounted in charging slot SLc of charging device 20.

Figure 6:
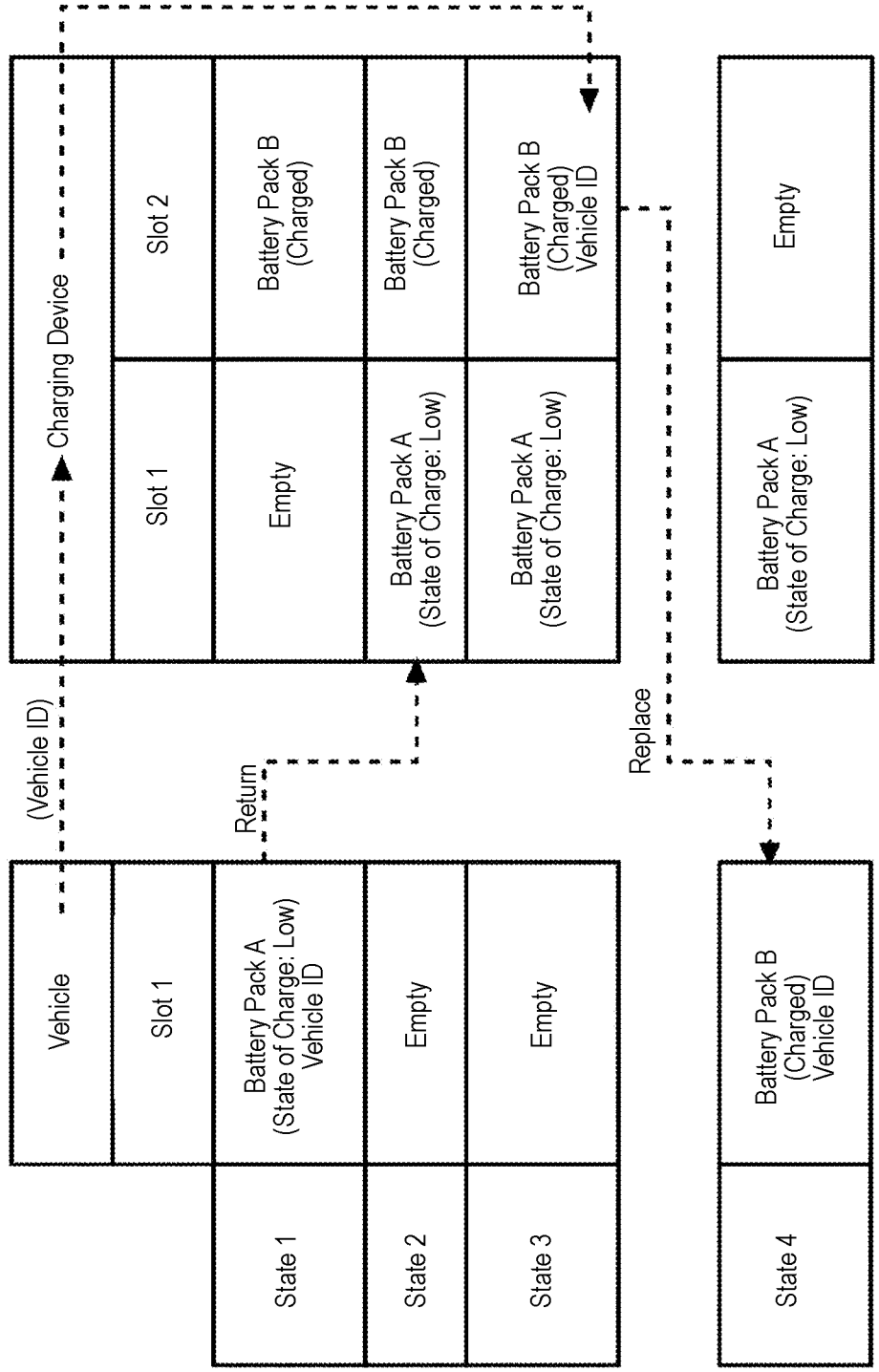
FIG. 6 is a diagram schematically illustrating a flow of ID assignment to the replaced battery pack when the battery pack mounted in the mounting slot of the vehicle is replaced.

FIG. 6 is a diagram schematically illustrating a flow of ID assignment to battery pack 10 after replacement when battery pack 10 mounted in mounting slot SL of vehicle 30 is replaced. In state 1, first charging slot SLc1 of charging device 20 is an empty slot, and charged second battery pack 10b is mounted in second charging slot SLc2. First battery pack 10a having a reduced state of charge is mounted in first mounting slot SLa1 of vehicle 30. First battery pack 10a includes a vehicle ID authenticated by vehicle controller 32. The vehicle ID ensures the identity between first battery pack 10a as a physical connection partner device and first battery pack 10a as a connection partner device of wireless communication as viewed from vehicle 30.

In state 2, the user (usually, the driver of vehicle 30) detaches first battery pack 10a from first mounting slot SLa1 of vehicle 30, and detached first battery pack 10a is mounted in first charging slot SLc1 of charging device 20. When first battery pack 10a is rented, a work of returning first battery pack 10a to charging device 20 is performed. When first battery pack 10a is detached from first mounting slot SLa1, vehicle controller 32 transmits the vehicle ID retained in first battery pack 10a to controller 22 of charging device 20.

In state 3, controller 22 of charging device 20 transmits, to battery controller 12 of second battery pack 10b, the vehicle ID received from vehicle controller 32, and writes the vehicle ID to battery controller 12 of second battery pack 10b.

In state 4, the user detaches second battery pack 10b from second charging slot SLc2 of charging device 20, and detached second battery pack 10b is mounted in first mounting slot SLa1 of vehicle 30. Battery pack 10 mounted in first mounting slot SLa1 of vehicle 30 is thus physically replaced. Since second battery pack 10b already has the vehicle ID, identity between second battery pack 10b as a physical connection partner device and second battery pack 10b as a partner device communicating wirelessly as viewed from vehicle 30 is secured.

In state 4, the user detaches second battery pack 10b from second charging slot SLc2 of charging device 20, and detached second battery pack 10b is mounted in first mounting slot SLa1 of vehicle 30. Battery pack 10 mounted in first mounting slot SLa1 of vehicle 30 is thus physically replaced. Since second battery pack 10b already has the vehicle ID, identity between second battery pack 10b as a physical connection partner device and second battery pack 10b as a partner device communicating wirelessly as viewed from vehicle 30 is secured.

Figure 7:
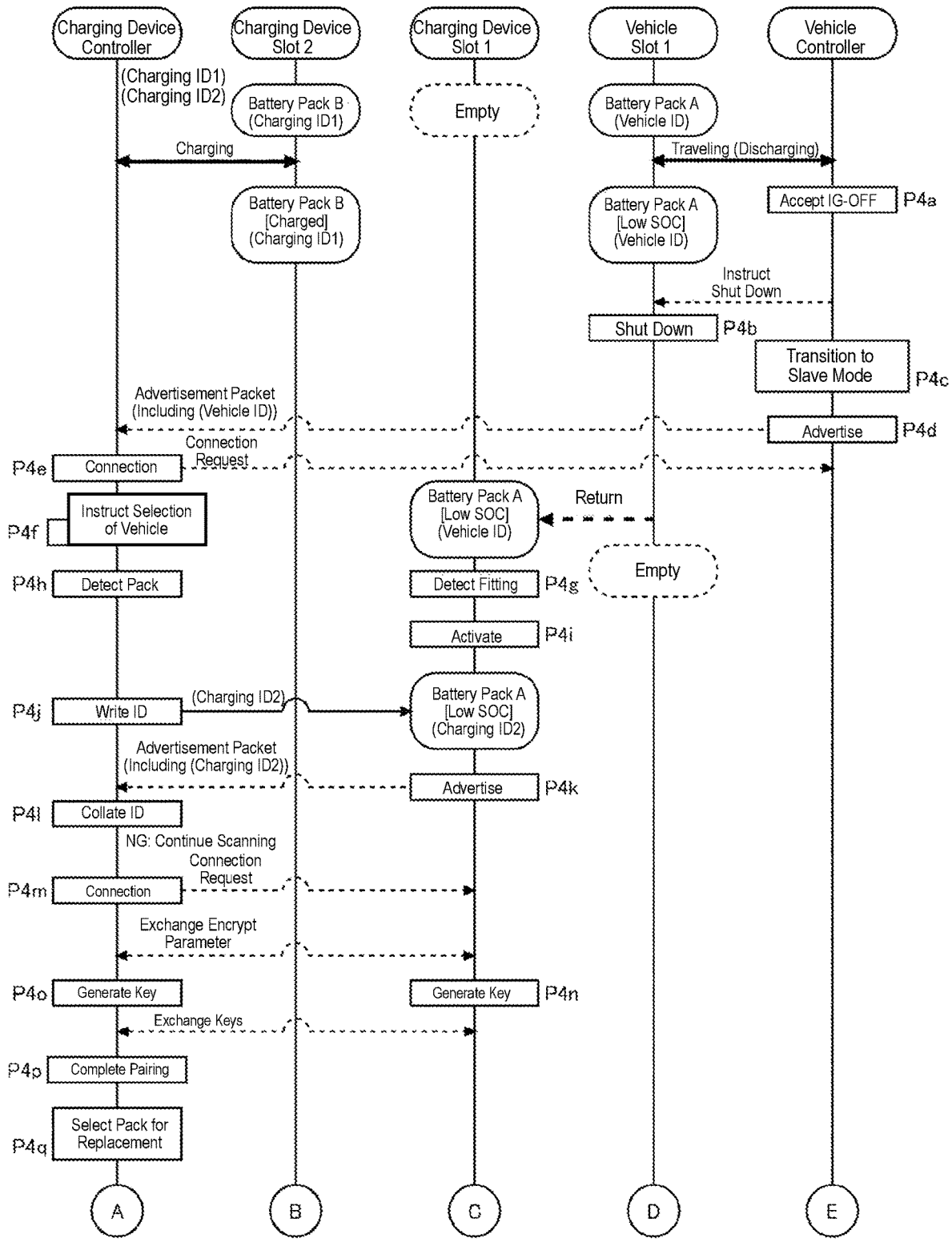
FIG. 7 is a sequence diagram illustrating a detailed process flow when the battery pack mounted in the mounting slot of the vehicle is replaced (part 1).
Figure 8:
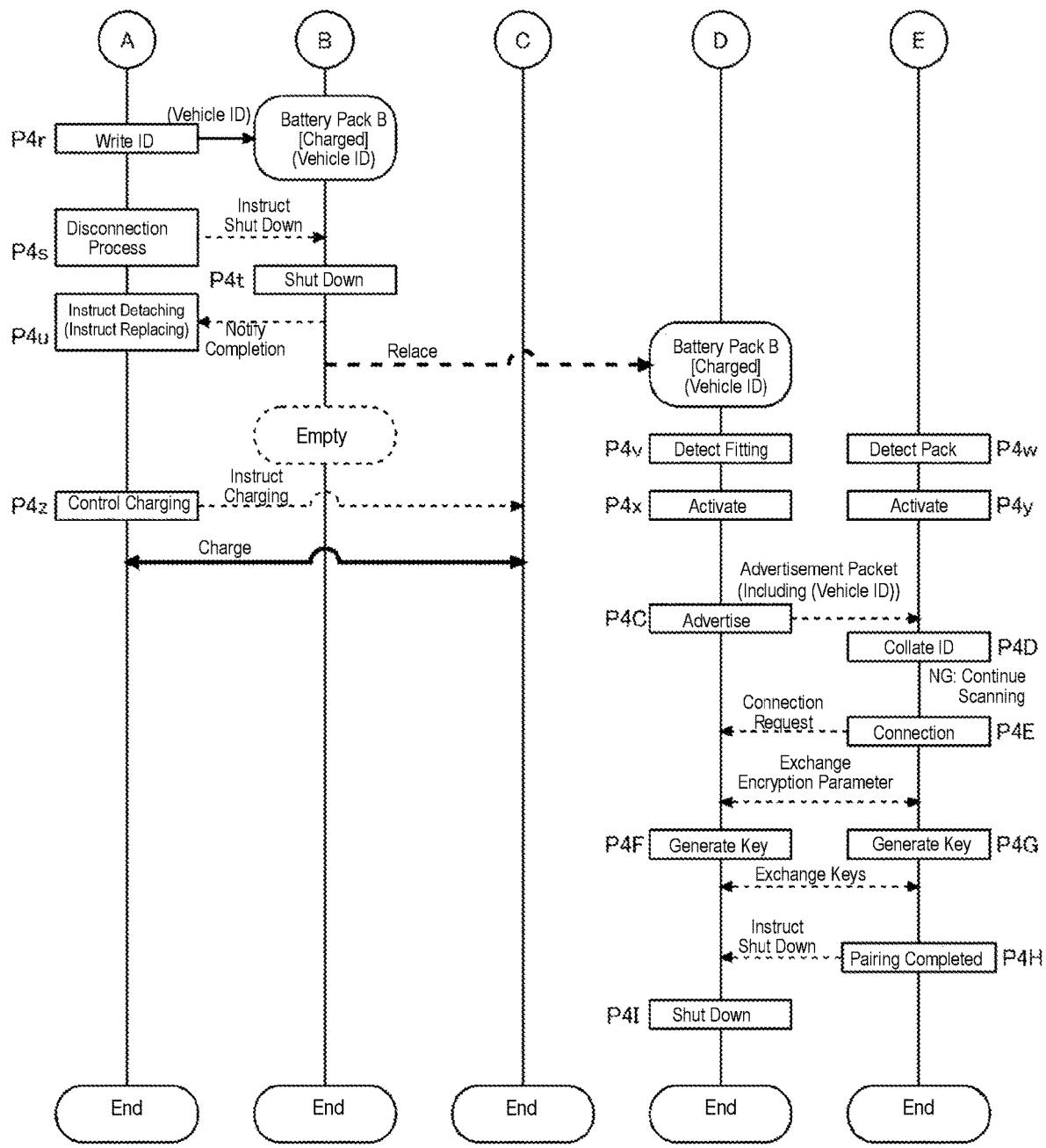
FIG. 8 is a sequence diagram illustrating a detailed process flow when the battery pack mounted in the mounting slot of the vehicle is replaced (part 2).

FIG. 7 is a sequence diagram illustrating a detailed process flow when battery pack 10 mounted in mounting slot SLa of vehicle 30 is replaced (part 1). FIG. 8 is a sequence diagram illustrating a detailed process flow when battery pack 10 mounted in mounting slot SLa of vehicle 30 is replaced (part 2). In horizontal lines in the following sequence diagrams, thin dotted lines denote wireless communication, thin solid lines denote wired communication, thick dotted lines denote physical movement of the battery pack, and thick solid lines denote charging and discharging of battery packs.

First charging slot SLc1 of charging device 20 is an empty slot, and second battery pack 10b is mounted in second charging slot SLc2. Second battery pack 10b includes a charging ID1 authenticated by controller 22 of charging device 20. The charging ID1 ensures identity between second battery pack 10b as a physical connection partner device and second battery pack 10b as a partner device communicating wirelessly as viewed from charging device 20.

Charging device 20 charges second battery pack 10b mounted in second charging slot SLc2. That is, a charging current flows from charging unit 29 to second battery pack 10b mounted in second charging slot SLc2. When the SOC of second battery pack 10b reaches an upper limit value, the charging is ended. The upper limit value may be an SOC corresponding to a full charge capacity or an SOC lower than the full charge capacity (for example, 90%).

First battery pack 10a is mounted in first mounting slot SLa1 of vehicle 30. First battery pack 10a includes a vehicle ID authenticated by vehicle controller 32. The vehicle ID ensures identity between first battery pack 10a as a physical connection partner device and first battery pack 10a as a connection partner device of wireless communication as viewed from vehicle 30. While vehicle 30 travels, a discharge current flows from first battery pack 10a to motor 311 via inverter 310. The SOC of first battery pack 10a decreases as vehicle 30 travels.

When an ignition-off operation is performed by the user (usually, the driver of vehicle 30), vehicle controller 32 accepts the ignition-off operation (P4a). Upon accepting the ignition off operation, vehicle controller 32 transmits a shutdown instruction to battery controller 12 of first battery pack 10a via near-field communication. Upon receiving the shutdown instruction from vehicle controller 32, battery controller 12 of first battery pack 10a is shut down (P4b).

Vehicle controller 32 transitions from a master mode of the near-field communication to a slave mode (P4c). In the near-field communication between vehicle controller 32 and battery controller 12 of first battery pack 10a mounted in first mounting slot SLa1, vehicle controller 32 serves as a master device while battery controller 12 of first battery pack 10a serves as a slave device. On the other hand, in the near-field communication between vehicle controller 32 and controller 22 of charging device 20, vehicle controller 32 serves as a slave device while controller 22 of charging device 20 serves as a master device. Vehicle controller 32 transitions from the master mode to the slave mode before being connected to controller 22 of charging device 20 via the near-field communication.

Vehicle controller 32 serves as a beacon terminal (peripheral terminal) and executes the advertisement of the near-field communication (P4d). Specifically, battery controller 12 transmits periodically at constant intervals, an advertisement packet as a beacon packet, including the vehicle ID assigned to first battery pack 10a and vehicle information (for example, vehicle model information or vehicle number) for specifying vehicle 30. The advertisement packet functions as a signal for notifying controller 22 of charging device 20 as a central terminal of the presence of the vehicle.

After controller 22 of charging device 20 receives the advertisement packet, controller 22 of charging device 20 starts a connection process with vehicle controller 32 (P4e). First, controller 22 of charging device 20 transmits a connection request to vehicle controller 32. Subsequently, controller 22 of charging device 20 causes display unit 27 to display the vehicle information (for example, vehicle model information or vehicle number) received from vehicle controller 32, and instructs the user to select vehicle information of the host vehicle (P4f). After the user performs an operation of selecting the vehicle information of the host vehicle on operation unit 28 of charging device 20, controller 22 of charging device 20 accepts the operation, thus completing pairing between controller 22 of charging device 20 and vehicle controller 32.

After first battery pack 10a is unmounted from first mounting slot SLa1 of vehicle 30 by the user and first battery pack 10a is mounted in first charging slot SLc1 of charging device 20, fitting detector 18 of first battery pack 10a detects the fitting in first charging slot SLc1 (P4g), and battery controller 12 of first battery pack 10a is activated (P4i). Controller 22 of charging device 20 detects that battery pack 10 is mounted in first charging slot SLc1 (P4h).

Controller 22 of charging device 20 wiredly transmits a charging ID2 to battery controller 12 of first battery pack 10a mounted in first charging slot SLc0, and writes the charging ID2 to battery controller 12 of first battery pack 10a (P4j). When battery controller 12 of first battery pack 10a receives the charging ID2, battery controller 12 serves as a beacon terminal and executes advertising via near-field communication (P4k). Specifically, battery controller 12 transmits periodically at constant intervals an advertisement packet including the charging ID2 received wiredly, as a beacon packet. The advertisement packet functions as a signal for notifying controller 22 of charging device 20 as the central terminal or vehicle controller 32 of vehicle 30 of the presence of the host vehicle.

Upon receiving the advertisement packet, controller 22 of charging device 20 collates the charging ID included in the received advertisement packet with the charging ID previously transmitted wiredly (P4l). In the example illustrated in FIG. 7, when the charging ID included in the received advertisement packet is the charging ID2, the collation succeeds. When the charging ID is not the charging ID2, the collation does not succeed, thus failing. When the collation fails, controller 22 of charging device 20 continues scanning of the advertisement packet. When the collation succeeds, controller 22 of charging device 20 starts a connection process to be connected to battery controller 12 of first battery pack 10a (P4m).

First, controller 22 of charging device 20 transmits a connection request to battery controller 12 of first battery pack 10a. Subsequently, encryption parameters (for example, the number of digits of an encryption key and an encryption level) are exchanged between controller 22 of charging device 20 and battery controller 12 of first battery pack 10a. Battery controller 12 of first battery pack 10a generates an encryption key used to encrypt communication data based on the exchanged encryption parameter (P4n). Controller 22 of charging device 20 generates an encryption key used to encrypt the communication data based on the exchanged encryption parameter (P4o). Finally, the generated encryption keys are exchanged between controller 22 of charging device 20 and battery controller 12 of first battery pack 10a. As a result, pairing between controller 22 of charging device 20 and battery controller 12 of first battery pack 10a is completed (P4p). The completion of the pairing completes a process of returning first battery pack 10a to charging device 20.

Controller 22 of charging device 20 selects another battery pack 10 with which first battery pack 10a is replaced (P4q). Specifically, controller 22 of charging device 20 selects one of charged battery packs 10 mounted in the charging slots SLc of charging stand 21. In the example illustrated in FIG. 7, charged second battery pack 10b mounted in second charging slot SLc2 is selected.

Controller 22 of charging device 20 wiredly transmits, to battery controller 12 of selected second battery pack 10b, the vehicle ID which has been received from vehicle controller 32, and writes the vehicle ID to battery controller 12 of second battery pack 10b (P3o).

Controller 22 of charging device 20 transmits a shutdown instruction to battery controller 12 of selected second battery pack 10b via near-field communication, and executes a disconnection process to be disconnected from battery controller 12 of second battery pack 10b (P4s). Upon receiving the shutdown instruction from controller 22 of charging device 20, battery controller 12 of second battery pack 10b is shut down (P4t). Battery controller 12 of second battery pack 10b transmits a shutdown completion notification to controller 22 of charging device 20 immediately before being shut down.

Upon receiving the shutdown completion notification from battery controller 12 of second battery pack 10b, controller 22 of charging device 20 instructs the user of vehicle 30 to detach second battery pack 10b mounted in second charging slot SLc2 (P4u). For example, controller 22 of charging device 20 causes display unit 27 to display a message instructing the user to detach second battery pack 10b mounted in second charging slot SLc2. At this moment, controller 22 of charging device 20 may output audio guidance from a loudspeaker (not illustrated) to the user. Only a lamp (not illustrated) of second charging slot SLc2 may be turned on or off. Only a lamp (not illustrated) of second charging slot SLc2 may be turned on in a color different from color of the lamp of the other charging slot.

When second battery pack 10b is detached from second charging slot SLc2 and second battery pack 10b is mounted in first mounting slot SLa1 of vehicle 30 by the user, fitting detector 18 of second battery pack 10b detects fitting to first mounting slot SLa1 (P4v), and battery controller 12 of second battery pack 10b is activated (P4x). After fitting detector 38 of vehicle 30 detects that battery pack 10 is mounted in first mounting slot SLa1 (P4w), vehicle controller 32 is activated (P4y).

Controller 22 of charging device 20 starts charging control of first battery pack 10a mounted in first charging slot SLc1 (P4z). Specifically, controller 22 of charging device 20 transmits a charging instruction to battery controller 12 of first battery pack 10a via near-field communication, and turns on second slot relay RYsb. Upon receiving the charging instruction, battery controller 12 of first battery pack 10a turns on power relay RYp. As a result, a charging current flows from charging unit 29 of charging device 20 to first battery pack 10a mounted in first charging slot SLc1.

Battery controller 12 of second battery pack 10b serves as a beacon terminal and executes advertising via near-field communication (P4C). Specifically, battery controller 12 transmits periodically at constant intervals, as a beacon packet, an advertisement packet including the vehicle ID written by controller 22 of charging device 20.

After receiving the advertisement packet, vehicle controller 32 collates the vehicle ID included in the received advertisement packet with the vehicle ID assigned to first battery pack 10a (P4D). When the collation of the vehicle ID fails, vehicle controller 32 continues scanning of the advertisement packet. When the collation of the vehicle IDs succeeds, vehicle controller 32 starts a connection process to be connected to battery controller 12 of second battery pack 10b (P4E).

First, vehicle controller 32 transmits a connection request to battery controller 12 of second battery pack 10b. Subsequently, encryption parameters are exchanged between vehicle controller 32 and battery controller 12 of second battery pack 10b. Battery controller 12 of second battery pack 10b generates an encryption key used to encrypt the communication data based on the exchanged encryption parameter (P4F). Vehicle controller 32 generates an encryption key used to encrypt communication data based on the exchanged encryption parameter (P4G). Finally, the generated encryption keys are exchanged between vehicle controller 32 and battery controller 12 of second battery pack 10b, thereby completing a pairing between vehicle controller 32 and battery controller 12 of second battery pack 10b (P4H). After the pairing is completed, vehicle controller 32 transmits a shutdown instruction to battery controller 12 of second battery pack 10b via near-field communication. Upon receiving the shutdown instruction from vehicle controller 32, battery controller 12 of second battery pack 10b is shut down (P4I).

Figure 9:
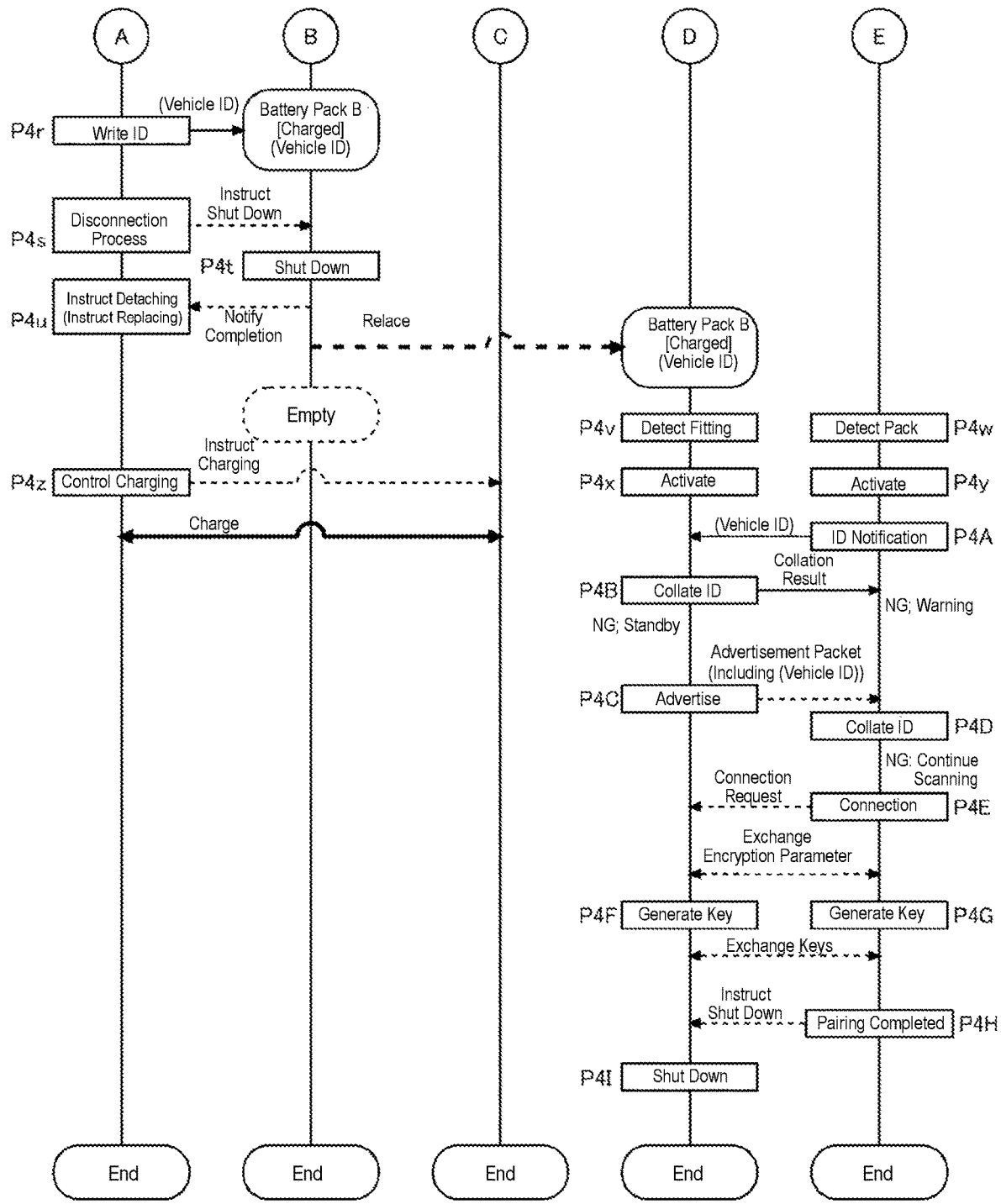
FIG. 9 is a sequence diagram illustrating a process flow according to a modification of the process illustrated in FIG. 8.

FIG. 9 is a sequence diagram illustrating a process flow according to a modification of the process illustrated in FIG. 8. In the modification illustrated in FIG. 9, a mechanism for enhancing the reliability of the authentication process by vehicle controller 32 of battery pack 10 mounted in first mounting slot SLa1 is introduced. Hereinafter, differences from the process illustrated in FIG. 8 will be described.

When battery controller 12 of second battery pack 10b is activated in process P4x and vehicle controller 32 is activated in process P4y, vehicle controller 32 wiredly transmits the vehicle ID assigned to first battery pack 10a to battery controller 12 of second battery pack 10b, and writes the vehicle ID to battery controller 12 of second battery pack 10b (P4A).

Upon wiredly receiving the vehicle ID from vehicle controller 32, battery controller 12 of second battery pack 10b collates the vehicle ID received from vehicle controller 32 with the vehicle ID written by controller 22 of charging device 20 (P4B). Battery controller 12 of second battery pack 10b wiredly transmits the collation result to vehicle controller 32. When the collation fails, battery controller 12 of second battery pack 10b transitions to a standby mode. Vehicle controller 32 displays, on meter panel 39, a warning that incorrect battery pack 10 is mounted in first mounting slot SLa1. After visually confirming the displayed warning, the user returns incorrectly mounted battery pack 10 to charging device 20, detaches correct battery pack 10 from charging device 20, and mounts the detached battery pack to first mounting slot SLa1. When new battery pack 10 is mounted in first mounting slot SLa1, the process returns to process P4v and process P4w.

In this modification, a process of wiredly transmitting the vehicle ID from vehicle controller 32 to battery controller 12 of battery pack 10 is added. This process prevents vehicle controller 32 and battery controller 12 of battery pack 10 mounted in adjacent vehicle 30 from being incorrectly paired.

As described above, in the present exemplary embodiment, when battery pack 10 mounted in vehicle 30 is detached and returned to charging device 20, the vehicle ID is transmitted from vehicle 30 to charging device 20 and charging device 20 writes the vehicle ID to anther battery pack 10 for replacement. As a result, when battery pack 10 for replacement is mounted in vehicle 30, vehicle 30 correctly identifies mounted battery pack 10 based on the vehicle ID. This configuration provides no malfunction, such as erroneous control of battery pack 10 mounted in another nearby vehicle 30 by vehicle controller 32 of certain vehicle 30, and secures the safety and security of entire vehicle system 1 using replaceable battery pack 10 and charging device 20. The user safely drives vehicle 30 only by detaching battery pack 10 mounted in charging device 20 and mounting the battery pack in vehicle 30.

Since the vehicle ID assigned to battery pack 10 returned to charging device 20 is written to another battery pack 10 for replacement via charging device 20 and reused, vehicle 30 that can use battery pack 10 for replacement is limited to vehicle 30 in which returned battery pack 10 is mounted. This configuration prevents the use of illegally acquired battery pack 10 (for example, stolen battery pack 10).

The control signals are transmitted and received between battery pack 10 and each of vehicle 30 and charging device 20 via near-field communication. This configuration reduces the number of pins included in the connector of battery pack 10. As a result, it is possible to reduce a mechanical connection failure between battery pack 10 and each of vehicle 30 and charging device 20. Firmware used in battery controller 12 of battery pack 10 can be updated via wireless communication, and the firmware can be easily updated.

The present disclosure has been described above according to the exemplary embodiment. It will be understood by those who are skilled in art that the exemplary embodiment is merely an example, that combinations of constituent elements and processes included in the exemplary embodiment may be modified in various forms, and that such modifications are also within the scope of the present disclosure.

In the above-described exemplary embodiment, instead of directly transmitting the vehicle ID from vehicle controller 32 to controller 22 of charging device 20, the vehicle ID may be transmitted from vehicle controller 32 to controller 22 of charging device 20 via a smartphone or a smart key of the user. In this case, the vehicle ID is transmitted from vehicle controller 32 to the smartphone or the smart key of the user via near-field communication, and the vehicle ID is transmitted from the smartphone or the smart key of the user to controller 22 of charging device 20 via near-field communication. As a result, even when a distance between vehicle 30 and charging device 20 is longer than a radio wave arrival distance of the near-field communication, the vehicle ID may be transferred from vehicle 30 to charging device 20.

The smartphone or the smart key of the user may be connected to controller 22 of charging device 20 wirelessly via near field communication (NFC) in a 13.56 MHz band. This configuration allows the above-described vehicle selection operation in charging device 20 to be omitted.

In the above-described exemplary embodiment, when battery pack 10 is replaced, vehicle controller 32 may transmit usage history information of battery pack 10 to controller 22 of charging device 20 via near-field communication. In this case, controller 22 of charging device 20 may predict the occurrence of the defect of battery pack 10 by analyzing the usage history information of battery pack 10 collected from vehicle 30.

The above-described exemplary embodiment has described an example of using battery pack 10 incorporating battery module 11 including the lithium ion battery cell, the nickel hydrogen battery cell, the lead battery cell, or the like. In this regard, a capacitor pack incorporating a capacitor module including an electric double layer capacitor cell, a lithium ion capacitor cell, or the like may be used. In this specification, the battery pack and the capacitor pack are collectively referred to as a power storage pack. Each relay in the above-described exemplary embodiment may be appropriately replaced with a semiconductor switch.

In the above-described exemplary embodiment, an electric motorcycle (electric scooter) is assumed as vehicle 30 using replaceable battery pack 10 as a power source. In this respect, vehicle 30 may be an electric bicycle. Vehicle 30 may be a four-wheeled electric automobile (EV). The electric automobile includes not only a full-standard electric automobile but also a low-speed electric automobile such as a golf cart or a land car used in a shopping mall or an entertainment facility.

An electric movable body using replaceable battery pack 10 as a power source is not limited to vehicle 30. For example, the electric movable body also includes an electric ship. For example, a power source of a water bus or a water taxi may be replaceable battery pack 10. The electric movable body also includes a train. For example, a train on which replaceable battery pack 10 is mounted can be used instead of a diesel train used in a non-electrified route. The electric movable body also includes an electric flying object. The electric flight object includes a multi-copter (drone). The multi-copter includes a so-called flying car. Any electric movable body can shorten an energy supply time.

The exemplary embodiment may be specified by the following items.

[Item 1]

A power storage pack authentication method includes: transmitting, by a controller (32) of an electric movable body (30), a signal including identification information identical to identification information retained in a first power storage pack (10*a*) via near-field communication when the first power storage pack (10*a*) is detached from the electric movable body (30); after a controller (22) of a charging device (20) receives the signal transmitted via the near-field communication and after the first power storage pack (10*a*) detached from the electric movable body (30) is mounted in a first charging slot (SLc1) of the charging device (20), wiredly transmitting, by the controller (22) of the charging device (20), the identification information received from the electric movable body (30) to a controller (12) of a second power storage pack (10*b*) which is replaceable with the first power storage pack (10*a*) and which is mounted in a second charging slot (SLc2); transmitting via near-field communication, by the controller (12) of the second power storage pack (10*b*), a signal including the identification information received from the charging device (20) after the second power storage pack (10*b*) detached from the second charging slot (SLc2) is mounted in the electric movable body (30); and collating, by the controller (32) of the electric movable body (30), whether or not the identification information included in the received signal matches the identification information retained in the first power storage pack (10*a*) after the controller (32) of the electric movable body (30) receives the signal transmitted via the near-field communication, and authenticating that the second power storage pack (10*b*) mounted in the electric movable body (30) is identical to a partner device communicating via the near-field communication when the identification information included in the received signal matches the identification information retained in the first power storage pack (10*a*).

Controller (32) of electric movable body (30) accurately authenticates whether or not mounted second power storage pack (10*b*) and the partner device communicating via the near-field communication are identical.

[Item 2]

The power storage pack authentication method according to item 1 further includes: wiredly transmitting, by the controller (32) of the electric movable body (30), the identification information retained in the first power storage pack (10*a*) to the controller (12) of the second power storage pack (10*b*) mounted in the electric movable body (30) before the controller (12) of the second power storage pack (10*b*) transmits the signal including the identification information received from the charging device (20) after the second power storage pack (10*b*) detached from the second charging slot (SLc2) is mounted in the electric movable body (30); and collating, by the controller (12) of the second power storage pack (10*b*), the identification information received from the charging device (20) with identification information received from the electric movable body (30), and wiredly transmitting a result of said collating to the controller (32) of the electric movable body (30). Controller (12) of the second power storage pack (10*b*) suspends the transmitting via the near-field communication of the signal including the identification information received from the charging device (20) when the result of said collating is that the identification information received from the charging device (20) does not match the identification information received from the electric movable body (30).

Controller (32) of electric movable body (30) reliably authenticates whether or not mounted second power storage pack (10*b*) is identical to the communication partner of the near-field communication.

[Item 3]

The power storage pack authentication method according to item 1 or 2 further includes: after the controller (22) of the charging device (20) receives the identification information from the controller (32) of the electric movable body (30) and the first power storage pack (10*a*) detached from the electric movable body (30) is mounted in the first charging slot (SLc1) of the charging device (20), wiredly transmitting another identification information to the controller (12) of the first power storage pack (10*a*); transmitting via the near-field communication, by the controller (12) of the first power storage pack (10*a*), the signal including the identification information received from the charging device (20): and after the controller (22) of the charging device (20) receives the signal transmitted via the near-field communication, collating, by the controller (22) of the charging device (20), whether or not the identification information included in the received signal matches another identification information wiredly transmitted; and authenticating that the first power storage pack (10a) mounted in the first charging slot (SLc1) is identical to a partner device communicating via the near-field communication when the identification information included in the received signal matches another identification information wiredly transmitted.

Controller (22) of charging device (20) accurately authenticates whether or not the communication partner of the near-field communication is identical to first power storage pack (10a) mounted in first charging slot (SLc1).

[Item 4]

In the power storage pack authentication method according to any one of items 1 to 3, the near-field communication is Bluetooth® Low Energy (BLE).

The near-field communication can be performed with low power consumption.

[Item 5]

A power storage pack (10) includes: a power storage unit (11) configured to supply electric power to an electric movable body (30); and a controller (12) configured to communicate with a controller (32) of the electric movable body (30) and a controller (22) of a charging device (20). The controller (12) of the power storage pack (10) is configured to: after the power storage pack is detached from the electric movable body (30) and is mounted in a charging slot (SLc1) of the charging device (20), wiredly receive identification information from the controller (32) of the electric movable body (30) received from the controller (32) of the electric movable body (30) after charging of the power storage pack is completed: and transmit via by near-field communication a signal including the identification information received from the charging device (20) after the power storage pack is detached from the charging slot (SLc1) and is mounted in the electric movable body (30). The signal transmitted via the near-field communication is utilized by the controller (32) of the electric movable body (30) for the controller (32) of the electric movable body (30) to authenticate whether or not the power storage pack mounted in the electric movable body (30) is identical to a partner device communicating via the near-field communication in the controller (32) of the electric movable body (30).

Controller (32) of electric movable body (30) accurately authenticates whether or not mounted power storage pack (10) is identical to the partner device communicating via the near-field communication.

[Item 6]

In the power storage pack according to item 5, the controller (12) power storage pack (10) is configured to: wiredly receive the identification information from the controller (32) of the electric movable body (30) before receiving the signal including the identification information from the charging device (20) transmitted via the near-field communication after the power storage pack is mounted in the electric movable body (30); collate the identification information received from the charging device (20) with the identification information received from the electric movable body (30), and wiredly transmit a result of said collating to the electric movable body (30); and suspend the transmitting, the near-field communication, of the signal including the identification information received from the charging device (20) when the result of said collating is that the identification information received from the charging device (20) does not match the identification information received from the electric movable body (30).

Controller (32) of electric movable body (30) reliably authenticates whether or not mounted power storage pack (10) is identical to the partner device communicating via the near-field communication.

[Item 7]

A charging device (20) includes: a plurality of charging slots (SLc1, SLc2); and a controller (22) configured to communicate with a controller (12) of a power storage pack (10) and a controller (32) of an electric movable body (30). The controller (22) of the charging device (20) is configured to: wiredly receive identification information retained in a first power storage pack (10a) from the controller (32) of the electric movable body (30) after the first power storage pack (10a) detached from the electric movable body (30) is mounted in a first charging slot (SLc1); wiredly transmit the identification information received from the first power storage pack (10a) to a controller (12) of a second power storage pack (10b) which is replaceable with the first power storage pack (10a) and which is mounted in a second charging slot (SLc2); wiredly transmit another identification information to the a controller (12) of the first power storage pack (10a) mounted in the first charging slot (SLc1); after receiving a signal transmitted via near-field communication, collate whether or not the identification information included in the received signal matches the another identification information wiredly transmitted; and authenticate that the first power storage pack (10a) mounted in the first charging slot (SLc1) is identical to a partner device communicating via the near-field communication when the identification information included in the received signal matches the another identification information wiredly transmitted.

Controller (22) of charging device (20) accurately authenticates whether or not the partner device communicating via the near-field communication is identical to first power storage pack (10a) mounted in first charging slot (SLc1).

[Item 8]

An electric movable body (30) includes: a motor (311); and a controller (32) configured to communicate with a controller (12) of a power storage pack and a controller (22) of a charging device (20). The controller (32) of the electric movable body (30) is configured to: transmit a signal including identification information identical to identification information retained in a first power storage pack (10a) via near-field communication after the first power storage pack (10a) is detached from the electric movable body (30); collate whether or not the identification information included in the received signal matches the identification information retained in the first power storage pack (10a) when the signal is received by the near-field communication in a case where a second power storage pack (10b) which is replaceable with the first power storage pack (10a) and which is detached from a second charging slot (SLc2) of the charging device (20) is mounted in the electric movable body (30) after the first power storage pack (10a) is mounted in a first charging slot (SLc1) of the charging device (20): and authenticate that the second power storage pack (10b) mounted in the electric movable body (30) is identical to a partner device communicating via the near-field communication in a case where the identification information included in the received signal matches the identification information retained in the first power storage pack (10a).

Controller (32) of electric movable body (30) accurately authenticates whether or not mounted second power storage pack (10b) is identical to the partner device communicating via the near-field communication.

[Item 9]

In the electric movable body (30) according to claim 8, the controller (32) of the electric movable body (30) is configured to: wiredly transmit the identification information retained in the first power storage pack (10a) to a controller (12) of the second power storage pack (10b) after the second power storage pack (10b) is mounted in the electric movable body (30); and wiredly receive, from the controller (12) of the second power storage pack (10b), the result of said collating. by the controller (12) of the second power storage pack (10b), the identification information received from the charging device (20) with the identification information received from the electric movable body (30).

Controller (32) of electric movable body (30) reliably authenticates whether or not mounted second power storage pack (10b) is identical to the partner device communicating via the near-field communication.

[Item 10]

A controller (32) of an electric movable body (30) is configured to: transmit a signal including identification information identical to identification information retained in a first power storage pack (10a) via near-field communication after the first power storage pack (10a) is detached from the electric movable body (30); collate whether or not the identification information included in the received signal matches identification information retained in the first power storage pack (10a) after the signal is received via the near-field communication and after a second power storage pack (10b) which is replaceable with the first power storage pack (10a) and which is detached from a second charging slot (SLc2) of a charging device (20) is mounted in the electric movable body (30) after the first power storage pack (10a) is mounted in a first charging slot (SLc1) of the charging device (20); and authenticate that the second power storage pack (10b) mounted in the electric movable body (30) is identical to a partner device communicating via the near-field communication when the identification information included in the received signal matches the identification information retained in the first power storage pack (10a).

Controller (32) of electric movable body (30) accurately authenticates whether or not mounted second power storage pack (10b) is identical to the partner device communicating via the near-field communication.

REFERENCE MARKS IN THE DRAWINGS 1 vehicle system
2 commercial power system
10 battery pack
11 battery module
E1-En cell
12 battery controller
13 processing unit
14 voltage measurement unit
15 antenna
16 wireless communication unit
17 current sensor
18 fitting detection unit
20 charging device
21 charging stand
SLc charging slot
22 controller
23 processing unit
25 antenna
26 wireless communication unit
27 display unit
28 operation unit
29 charging unit
30 vehicle
31 battery mounting unit
SLa mounting slot
32 vehicle controller
33 processing unit
34 relay controller
35 antenna
36 wireless communication unit
37 pack detection unit
38 fitting detection unit
39 meter panel
310 inverter
311 motor
312 tire
RYm main relay
RYsa first slot relay
RYsb second slot relay
RYp power relay
RYc pack-side communication relay
RYca first vehicle-side communication relay
RYcb second vehicle-side communication relay
F2 fuse
R2 resistor
Tp positive-electrode terminal
Tm negative-electrode terminal

The invention claimed is:

1. A power storage pack authentication method comprising:
transmitting, by a controller of an electric movable body, a first signal including identification information identical to identification information retained in a first power storage pack via near-field communication when the first power storage pack is detached from the electric movable body;
after a controller of a charging device receives the first signal transmitted via the near-field communication and after the first power storage pack detached from the electric movable body is mounted in a first charging slot of the charging device, transmitting via wire, by the controller of the charging device, the identification information received from the electric movable body to a controller of a second power storage pack which is replaceable with the first power storage pack and which is mounted in a second charging slot;
transmitting via near-field communication, by the controller of the second power storage pack, a second signal including the identification information received from the charging device after the second power storage pack detached from the second charging slot is mounted in the electric movable body;
after the controller of the electric movable body receives the second signal transmitted via the near-field communication, collating, by the controller of the electric movable body, whether or not the identification information included in the second signal received by the controller of the electric movable body matches the identification information retained in the first power storage pack; and
authenticating that the second power storage pack mounted in the electric movable body is identical to a partner device communicating via the near-field communication as a result that the identification information included in the second signal received from the second power storage device matches the identification information retained in the first power storage pack.

2. The power storage pack authentication method according to claim 1, further comprising:

transmitting via wire, by the controller of the electric movable body, the identification information retained in the first power storage pack to the controller of the second power storage pack mounted in the electric movable body before the controller of the second power storage pack transmits the second signal after the second power storage pack detached from the second charging slot is mounted in the electric movable body; and collating, by the controller of the second power storage pack, the identification information received from the charging device with identification information received from the electric movable body, and transmitting via wire a result of said collating to the controller of the electric movable body, wherein the controller of the second power storage pack suspends the transmitting via the near-field communication of the second signal when the result of said collating result is that the identification information received from the charging device does not match the identification information received from the electric movable body.

3. The power storage pack authentication method according to claim 1, further comprising:

after the controller of the charging device receives the identification information from the controller of the electric movable body and the first power storage pack detached from the electric movable body is mounted in the first charging slot of the charging device, transmitting via wire another identification information to the controller of the first power storage pack;

transmitting via the near-field communication, by the controller of the first power storage pack, a third signal including the another identification information received from the charging device;

after the controller of the charging device receives the third signal transmitted via the near-field communication, collating, by the controller of the charging device, whether or not identification information included in the third signal received by the controller of the charging device matches the another identification information transmitted via wire; and authenticating that the first power storage pack mounted in the first charging slot is identical to a partner device communicating via the near-field communication when the identification information included in the third signal received by the controller of the charging device matches the another identification information transmitted via wire.

4. The power storage pack authentication method according to claim 1, wherein the near-field communication is Bluetooth® Low Energy (BLE).

5. A power storage pack comprising:

a power storage unit that is chargeable and is configured to supply electric power to an electric movable body; and a controller configured to communicate with a controller of the electric movable body and a controller of a charging device, wherein the controller of the power storage pack is configured to:

after the power storage pack is detached from the electric movable body and is mounted in a charging slot of the charging device, receive via wire identification information from the controller of the electric movable body after charging of the power storage unit is completed; and transmit via near-field communication, by the controller of the power storage pack, a signal including the identification information received from the charging device after the power storage pack is detached from the charging slot and is mounted in the electric movable body, and the signal transmitted via the near-field communication is utilized by the controller of the electric movable body to authenticate whether or not the power storage pack mounted in the electric movable body is identical to a partner device communicating via the near-field communication in the controller of the electric movable body.

6. The power storage pack according to claim 5, wherein the controller of the power storage pack is configured to:

receive via wire the identification information from the controller of the electric movable body before receiving the signal including the identification information from the charging device transmitted via the near-field communication after the power storage pack is mounted in the electric movable body;

collate the identification information received from the charging device with the identification information received from the electric movable body, and transmit via wire a result of said collating to the electric movable body; and suspend the transmitting, the near-field communication, of the signal including the identification information received from the charging device when the result of said collating is that the identification information received from the charging device does not match the identification information received from the electric movable body.

7. A charging device comprising:

a plurality of charging slots including a first charging slot and a second charging slot; and a controller configured to communicate with a controller of a power storage pack and a controller of an electric movable body, wherein the controller of the charging device is configured to:

receive via wire identification information retained in a first power storage pack from the controller of the electric movable body after the first power storage pack detached from the electric movable body is mounted in the first charging slot;

transmit via wire the identification information to a controller of a second power storage pack which is replaceable with the first power storage pack and which is mounted in the second charging slot;

transmit via wire another identification information to a controller of the first power storage pack mounted in the first charging slot;

after receiving a signal transmitted via near-field communication, collate whether or not identification information included in the signal received via the near-field communication matches the another identification information transmitted via wire; and authenticate that the first power storage pack mounted in the first charging slot is identical to a partner device communicating via the near-field communication when the identification information included in the signal received via the near-field communication matches the another identification information transmitted via wire.

8. An electric movable body comprising:

a motor; and a controller configured to communicate with a controller of a power storage pack and a controller of a charging device, wherein the controller of the electric movable body is configured to:

transmit a first signal including identification information identical to identification information retained in a first power storage pack via near-field communication after the first power storage pack is detached from the electric movable body;

when receiving a second signal via near-field communication in a case where a second power storage pack which is replaceable with the first power storage pack and which is detached from a second charging slot of the charging device is mounted in the electric movable body after the first power storage pack is mounted in a first charging slot of the charging device, collate whether or not identification information included in the second signal received by the controller of the electric movable body matches the identification information retained in the first power storage pack and authenticate that the second power storage pack mounted in the electric movable body is identical to a partner device communicating via the near-field communication in a case where the identification information included in the second signal received by the controller of the electric movable body matches the identification information retained in the first power storage pack.

9. The electric movable body according to claim 8, wherein the controller of the electric movable body is configured to:

transmit via wire the identification information retained in the first power storage pack to a controller of the second power storage pack after the second power storage pack is mounted in the electric movable body; and receive via wire, from the controller of the second power storage pack, a result of said collating by the controller of the second power storage pack, the identification information received from the charging device with the identification information received from the electric movable body.

10. A controller of an electric movable body, wherein the controller of the electric movable body is configured to:

transmit a first signal including identification information identical to identification information retained in a first power storage pack via near-field communication after the first power storage pack is detached from the electric movable body;

after receiving a second signal via the near-field communication and after a second power storage pack which is replaceable with the first power storage pack and which is detached from a second charging slot of a charging device is mounted in the electric movable body after the first power storage pack is mounted in a first charging slot of the charging device, collate whether or not identification information included in the second signal matches the identification information retained in the first power storage pack; and authenticate that the second power storage pack mounted in the electric movable body is identical to a partner device communicating via the near-field communication when identification information included in the second signal received by the controller of the electric movable body matches the identification information retained in the first power storage pack.

* * * * *